(12) United States Patent
Forster et al.

(10) Patent No.: US 7,609,166 B2
(45) Date of Patent: Oct. 27, 2009

(54) RFID TAG HOUSING

(75) Inventors: Ian J. Forster, Chelmsford (GB); Michael G. Ginn, Chelmsford (GB)

(73) Assignee: Avery Dennison Corporation, Pasadena, CA (US)

( * ) Notice: Subject to any disclaimer, the term of this patent is extended or adjusted under 35 U.S.C. 154(b) by 497 days.

(21) Appl. No.: 11/650,297

(22) Filed: Jan. 4, 2007

(65) Prior Publication Data

US 2008/0165015 A1 Jul. 10, 2008

(51) Int. Cl.
*G08B 13/14* (2006.01)
(52) U.S. Cl. .................................................. 340/572.8
(58) Field of Classification Search .............. 340/572.8, 340/572.1, 572.9, 572.7; 343/700 R
See application file for complete search history.

(56) References Cited

U.S. PATENT DOCUMENTS

| | | | | |
|---|---|---|---|---|
| 5,986,562 A | * | 11/1999 | Nikolich | 340/693.5 |
| 7,336,185 B2 | * | 2/2008 | Turner et al. | 340/572.8 |
| 2006/0086808 A1 | * | 4/2006 | Appalucci et al. | 235/492 |
| 2006/0250254 A1 | * | 11/2006 | Harris et al. | 340/572.8 |

* cited by examiner

*Primary Examiner*—Phung Nguyen
(74) *Attorney, Agent, or Firm*—Roberts Mlotkowski Safran & Cole, P.C.; Thomas W. Cole

(57) ABSTRACT

An RFID tag housing is disclosed. The housing can include a tag holder, which holds an RFID tag, and an attachment arrangement for attaching the housing to a receptacle. The attachment arrangement may also prevent rotation about a frame member of the receptacle to which the housing is attached. The housing can hold an RFID tag at a spacing above the receptacle's framework, allowing the tag to be read over the top of the receptacle and its contents, as well as other receptacles positioned nearby. This spacing can also allow use of the framework as a ground plane for the RFID tag antenna.

34 Claims, 3 Drawing Sheets

RFID TAG HOUSING

FIELD OF THE INVENTION

The invention generally relates to housings for radio frequency identification (RFID) tags. In particular, the invention relates to housings suitable for mounting RFID tags to receptacles, including metal cages for moving goods.

BACKGROUND TO THE INVENTION

RFID tags are often used for identifying goods in inventory and other systems. These tags may be attached directly to a particular product, or may be attached to a container containing the product. Each RFID tag includes a transponder, memory and an antenna, and, when interrogated by an RFID reader, can emit signals in accordance with the information stored in the memory. Some tags can be read and rewritten, allowing the data stored in the memory to be updated.

RFID tags can be attached to the outside of large receptacles for transport of products between distribution centres and stores, in retail environments and the like. As the receptacle is moved, the RFID tag may be read by stationary RFID readers ("portals") or handheld readers to keep track of product movements. The RFID tag may contain information identifying the particular receptacle or identifying the product contained in the receptacle.

However, receptacles are not always moved in the same manner. In particular, the orientation of the receptacle as it passes through a portal varies, so that the RFID tag may not be properly aligned with the reader. For example, RFID tags which are insensitive to being mounted on metal surfaces commonly radiate poorly in a direction at 90° to their normal axes. Thus, if a receptacle is oriented with respect to the reader at 90° to the tag's normal axis, the reader may not communicate effectively with the RFID tag.

RFID tags may also be physically shielded from readers. For example, where two receptacles are moved at the same time, the tag may be positioned between the two receptacles. Also, goods within the receptacle may shield the tag if it is positioned on the side of the receptacle away from the reader.

It is therefore an object of the invention to provide an RFID tag housing which allows more reliable reading of RFID tags attached to receptacles.

It is a further object of the invention to provide an RFID tag housing which uses the object to which a tag is to be mounted to beneficially affect operation of the tag.

It is yet a further object of the invention to provide an RFID tag housing which is simple and quick to install.

SUMMARY OF THE INVENTION

An exemplary embodiment of the invention provides an RFID tag housing that can be configured to mount to a receptacle. The housing may include an RFID tag holder that is configured to retain an RFID tag. The housing may further include an attachment arrangement spaced from the RFID tag holder and configured to attach the housing to the receptacle such that, in use, the housing extends upwards from the top of the receptacle, maintaining the RFID tag at a spacing above the top of the receptacle.

Another exemplary embodiment of an apparatus according to the present invention for housing an RFID tag includes an RFID tag holder and an attachment arrangement. The RFID tag holder maintains the RFID tag. The attachment arrangement couples to a top of a receptacle and is also mechanically coupled to the RFID tag holder. The attachment arrangement includes an extension to maintain a predetermined spacing between the RFID tag holder and the top of the receptacle. The attachment arrangement includes a fastener to attach to the top of the receptacle such that, in use, the housing extends upwards from the top of the receptacle and the RFID tag holder is maintained at the predetermined spacing above the top of the receptacle.

Another exemplary embodiment of the invention describes an RFID tag housing that may be configured to mount to a receptacle, with the receptacle including a framework. The housing may further include an RFID tag holder that is configured to retain an RFID tag. Additionally, the housing can have an attachment arrangement spaced apart from the RFID tag holder and configured to attach the housing to the framework, which may act to prevent the RFID tag housing from rotating around the framework. Therefore, in use, the housing can extend upwards from the top of the receptacle and maintain the RFID tag at a spacing above the top of the receptacle and the framework, thereby ameliorating interference with RFID signals received or emitted by the RFID tag.

In yet another exemplary embodiment, an RFID tag housing configured to mount to a cage is described. The cage onto which the housing is mounted may have mesh walls supported by a framework with one or more top frame members. The housing may also include first and second cooperating components configured to engage with each other around at least one of the top frame members, thereby securing the housing to the cage. Further, the first and second components together can provide, in use, a first substantially horizontal opening for accommodating the top frame member and a second opening for accommodating an element of the mesh such that the RFID tag housing is prevented from rotating around the top frame member. Additionally, the first and second components may provide a recess for accommodating an RFID tag, and the housing may extend upwards from the top frame member such that the recess is spaced above the cage.

Another aspect of the invention can describe an RFID tag housing configured to mount to a metallic element. This housing can include an RFID tag holder configured to retain an RFID tag with a monopole antenna. The can also have an attachment arrangement spaced from the RFID tag holder and configured to attach the housing to the metallic element such that, in use, the housing extends away from the metallic element to maintain the RFID tag at a spacing from the metallic element, which provides a ground plane for the monopole antenna.

BRIEF DESCRIPTION OF THE DRAWINGS

Advantages of embodiments of the present invention will be apparent from the following detailed description of the exemplary embodiments thereof, which description should be considered in conjunction with the accompanying drawings in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Figure 1:
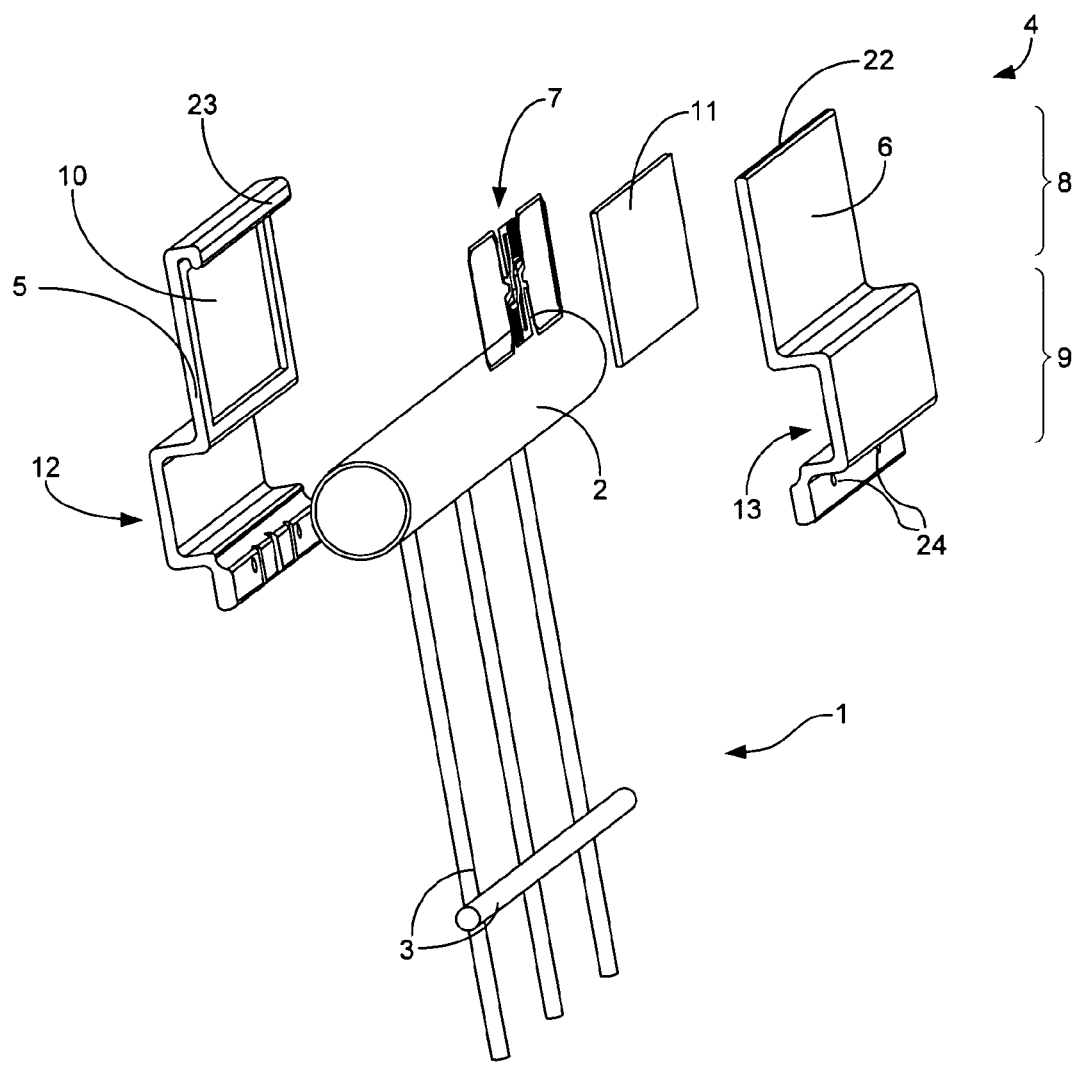
FIG. 1 is an exemplary exploded perspective view of an RFID tag housing according to one embodiment.
Figure 2:
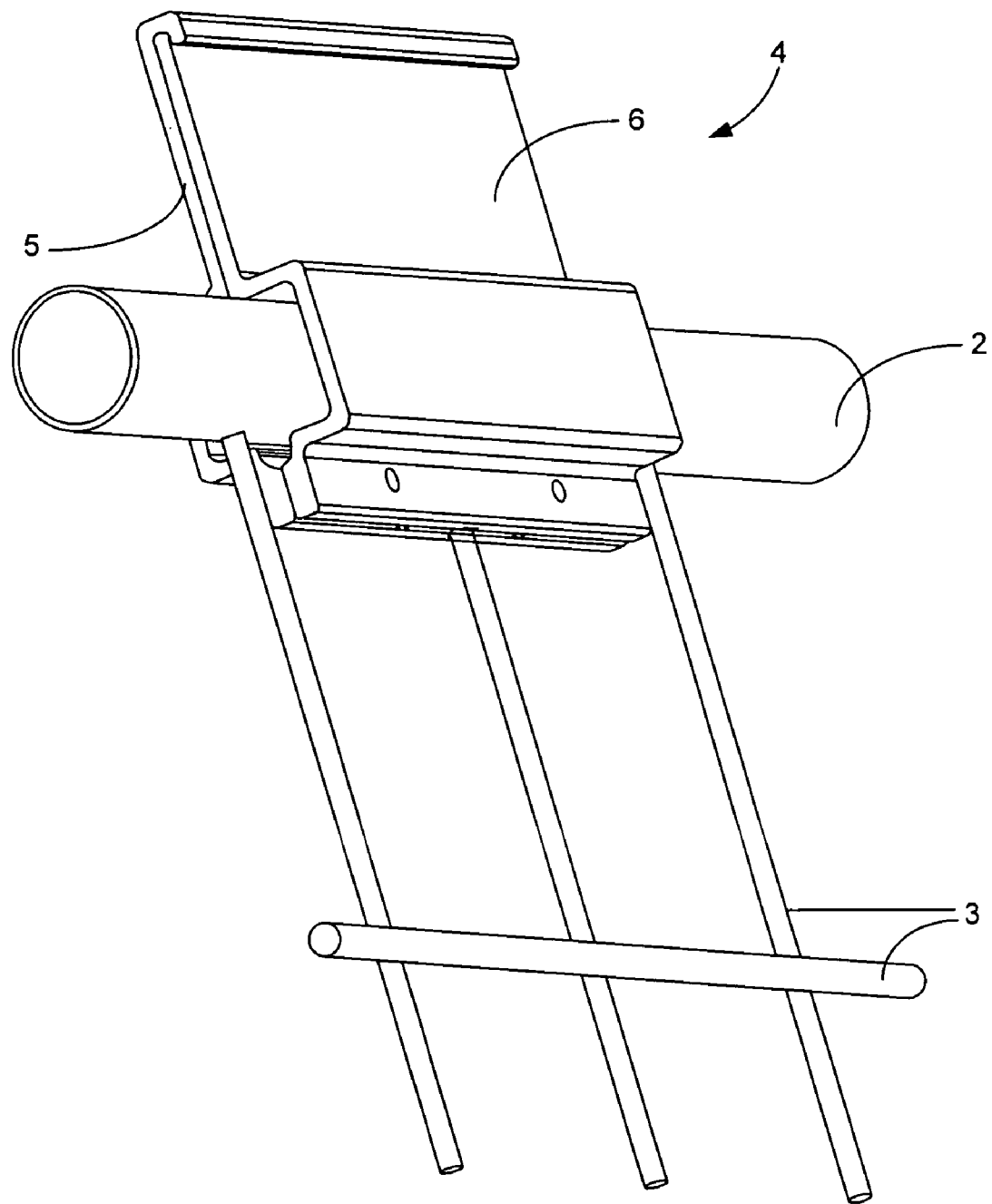
FIG. 2 is an exemplary perspective view of the RFID tag housing of FIG. 1, in its assembled state.

FIG. 1 shows an exemplary exploded view of a receptacle for an RFID tag and FIG. 2 shows an exemplary assembled view. This view includes part of a receptacle 1 of the type having a metallic framework including one or more top frame members 2. In general, the framework can include top frame members 2 defining the top of the receptacle and a number of supporting frame members (not shown) connecting the top frame members to the base (not shown) of the receptacle. The receptacle 1 can include walls formed from a wire mesh 3. Such receptacles are sometimes known as "cages" or "roll cages". Further, the receptacle may be of a large size, for moving products in a retail or similar environment. Additionally, other types of receptacles known to one having ordinary skill in the art may also be suitable for use with the inventive RFID tag housing.

The RFID tag housing 4 may also include a first component 5 which can cooperate with a second component 6 to hold the RFID tag 7 and to attach it to the receptacle 1. In exemplary FIG. 2, another exemplary view shows the assembled housing 4, with first component 5 coupled with second component 6 and attached to a top frame member 2.

The housing 4 generally includes a tag holder 8 for holding the RFID tag 7 and an attachment arrangement 9, spaced from the tag holder 8, for attaching the housing to the receptacle 1.

Addition, the tag holder 8 can include a recess 10 in the first component 5. In use, the RFID tag 7 can be placed in the recess 10 and may be covered by a foam insert 11 which cushions the tag. The foam insert 11 may also act to seal the recess 10 against ingress of contaminants such as water and dirt. Alternatively, a separate seal could be provided. When the first and second components are brought together (as shown in FIG. 2), the second component 6 can close the recess 10, such that the RFID tag is securely held within the housing 4. The recess could alternatively be formed in either component, for example by disposing foam or another sealing agent around the edges or perimeter of one or both of first component 5 and second component 6, or by a combination of the two components.

Figure 3:
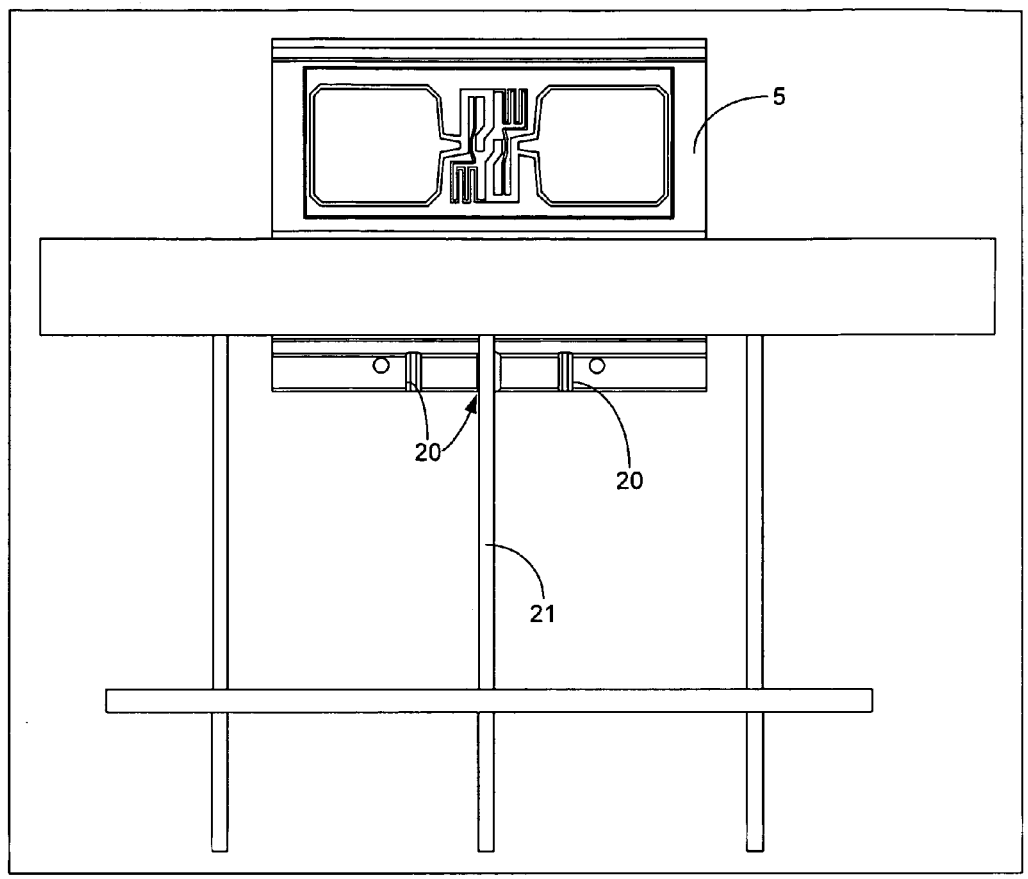
FIG. 3 is an exemplary diagram showing a first component of the RFID tag housing of FIG. 1.

The attachment arrangement 9 may be formed as follows. The first component 5 can be fabricated with a concave portion 12 and a similar concave portion 13 may be provided in the second component 6. The two concave portions together can be dimensioned to form an opening to enclose the top frame member 2, as shown in FIG. 2. The opening can be generally horizontal, in order to accommodate the horizontal top frame member 2. In other exemplary embodiments, an opening may be required at an angle to the horizontal to accommodate a frame member lying at that angle.

Where the top frame member 2 is of a square or other non-circular cross-section, such concave portions may operate to secure the housing 4 to the top frame member 2 and also to prevent its rotation, such that the housing 4 is fixed in position. However, where the top frame member is of circular cross section, as shown in FIGS. 1-2, the housing could rotate around the top frame member. Therefore, the attachment arrangement 9 may also be also arranged to prevent rotation. To this end, the attachment arrangement can engage with the mesh of the receptacle wall, as shown in exemplary FIG. 3. The first component 5 can be formed with one or more grooves 20. FIG. 3 shows a particular mesh element 21 engaged with a groove 20. A similar groove may be provided in the second component (not shown in FIG. 3) such that the two grooves cooperate to form an opening in which the mesh element 21 lies. This prevents rotation of the assembled housing around the top frame member.

A number of different grooves may be provided in the same housing to accommodate a number of different meshes, so that the housing can be fitted to a number of different receptacles. For example, grooves of different dimensions could be provided to accommodate meshes with different wire thicknesses. Similarly, grooves may be positioned to accommodate meshes with a number of different mesh spacings.

The first and/or second components may alternatively be formed with a slightly more flexible or conformable plastic in the region of the mesh. For example, the thickness or structure of the plastic used in the components may be varied. This can allow the housing to give slightly if the mesh is deformed or otherwise altered from its original shape, as it might be by an impact or other factors.

To assemble the housing 4, the RFID tag 7 and foam insert 11 can be positioned in the recess 10, and the first component 5 can be positioned on the receptacle as shown in FIG. 3. The top end 22 of the second component 6 may be slid under the lip 23 of the first component and the lower end of the second component 6 can be rotated into position against the first component 5. The two components may then be fastened together using the fastening arrangement 24. Thus, the housing can be securely held in place on the top frame member 2 and the two components may be joined by the combination of the top end 22 of the second component and the lip 23 of the first component, along with the fastening arrangement 24.

The fastening arrangement 24 may, in one exemplary embodiment, simply be cooperating holes on each component, such that the pieces can be riveted together. Screws, bolts and the like may also be suitable for fastening arrangement 24. In another alternative embodiment, adhesives may be used, either pre-applied to the components or applied at the time of assembly. Suitable adhesives may include hot-melt glues and adhesive films, along with others known to one of ordinary skill in the art. Plastic welding could also be used to fasten the two components together, including plastic welding using ultrasonics and pressure, or solvents. In yet another exemplary embodiment, the components could include cooperating mechanical features to effect fastening, forming a mechanical locking mechanism. For example, the first component could include a number of holes for receiving structures on the second component, such as expanding structures similar to those used in tie wraps.

The latch formed by the top end 22 of the second component 6 and the lip 23 of the first component 5 may, in another exemplary embodiment, be replaced by any other suitable form of latch or other arrangement, as will be readily understood by a skilled reader. For example, the first and second components could be formed as a single piece with a hinge at the top. However, it may be difficult to mold a hinge which is both flexible and strong enough to be durable. This is especially the case if relatively rigid plastics are used.

The exemplary pictured form of latch provides one simple solution, allowing very simple and rapid installation of the housing. The latch operates to align the first and second components and to join them at their top ends when they are fastened together at their bottom ends by the fastening arrangement 24. This allows the two components to be fastened together at only one end, while providing a solid connection at both ends. Exemplary suitable materials for fabricating the first and second components include high density polyethylene, polypropylene, nylon and polycarbonate. Polycarbonate can be treated with additives to protect it against solvents. These materials are very tough and durable. The first and second components may be fabricated by any suitable process, including injection molding.

The RFID tag housing can hold the RFID tag in position above the top frame member 2, offering a variety of potential advantages. The spacing of the tag above the top of the receptacle can reduce the effects of interference on signals emitted or received by the tag. Such interference generally arises from physical shielding by contents of receptacles and adjacent receptacles. This spacing allows the tag to be read over the top of other receptacles and receptacle contents. The top frame member is often made of metal, so spacing of the tag above this metal member also reduces interference caused by mounting the tag on a metallic surface.

A tag mounted in such a housing may be read from many different angles. Vertical mounting of the RFID tag antenna can also allow for the full use of the 360° radiation pattern of some tags.

Contents of the receptacle may be stacked out of the top of the receptacle, so it may also be desirable to use an RFID tag which will work well when positioned adjacent to those contents.

The top frame member may also be used advantageously in operation of the RFID tag to enhance the operation of the tag. For example, the metal member may provide a ground plane for the RFID tag antenna. This can be particularly advantageous where a monopole antenna is used. The tag may be mounted above the top frame member 2, with its antenna in a substantially vertical orientation, allowing its 360° radiation pattern to be fully utilised.

Figure 4:
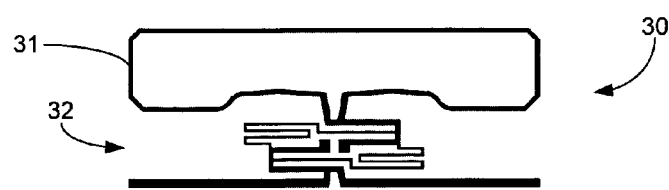
FIG. 4 is an exemplary diagram showing a possible design of a simple monopole antenna.

FIG. 4 shows one exemplary design of an RFID tag 30 with a monopole antenna for use with the RFID tag housing. The tag 30 can include a monopole loop antenna 31 with circuitry 32 feeding the antenna and providing the tag functionality. This tag can be inserted into the housing in place of the RFID tag 7 with a dipole antenna shown in FIGS. 1 and 3.

Other types of antenna may also benefit from the spacing above the top frame member 2. For example, dipole antennas of various types, including self-compensating antennas such as disclosed in U.S. Pat. No. 7,055,754, which is hereby incorporated by reference in its entirety, will maintain optimised performance when mounted at a defined spacing above the metal top frame member 2. Other antennas, such as slot antennas, slot/loop hybrids and multipole antennas such as used in the Avery Dennison Triflex tag will all generally have improved read performance when mounted at a defined spacing above the metal top frame member 2.

In some applications, the spacing between the top frame member and the RFID tag and/or the antenna may be an important consideration. In some exemplary embodiments, the spacing between the top frame member and the RFID tag and/or the antenna may be calculated to a predetermined amount that allows for optimal performance. However, proper design of the tag and the use of compensating technologies such as disclosed in U.S. Pat. No. 7,055,754 can allow the performance of the tag to be relatively insensitive to this spacing.

The tag housing may also be designed to be particularly simple to install, allowing rapid and foolproof installation. The housing may further be very robust, designed not only to have an approximately ten year life in a rugged environment, but also to protect an RFID tag from damage and contamination throughout that period. The housing may further be used with many different types and sizes of receptacles as well as with many different types of RFID tags.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and illustrative examples shown and described. Accordingly, departures may be made from such details without departure from the spirit or scope of the Applicant's general inventive concept.

The invention claimed is:

1. An apparatus for housing an RFID tag comprising:
an RFID tag holder in which to dispose said RFID tag; and
an attachment arrangement to couple to a top of a receptacle and mechanically coupled to the RFID tag holder, said attachment arrangement including an extension to maintain a predetermined spacing between the RFID tag holder and the top of the receptacle, and said attachment arrangement including a fastener to attach to the top of the receptacle such that, in use, the RFID tag holder extends upwards from said top of the receptacle and the RFID tag holder is maintained at said predetermined spacing above the top of the receptacle.

2. The apparatus as in claim 1, wherein the fastener of the attachment arrangement is configured to engage with a top frame member of the receptacle and with a wall of the receptacle such that the housing is prevented from rotating around the top frame member.

3. The apparatus as in claim 2, wherein the apparatus is further configured to mount to a receptacle having a framework and mesh walls, wherein the attachment arrangement comprises a first substantially horizontal opening for accommodating the top frame member, and a second opening for accommodating an element of the mesh such that the RFID tag housing is prevented from rotating around the top frame member.

4. The apparatus as in claim 3, further comprising a plurality of second openings, positioned and dimensioned such that the fastener of the attachment arrangement is configured to accommodate one of two or more different meshes.

5. The apparatus as in claim 1, further comprising first and second cooperating components, together providing the RFID tag holder and attachment arrangement.

6. The apparatus as in claim 5, wherein the RFID tag holder comprise a recess formed by one or both of the first and second cooperating components, such that an RFID tag can be placed in the recess when the components are apart and is retained in the recess when the components are together.

7. The apparatus as in claim 6, further comprising a seal disposed around the recess which seals the recess to protect the RFID tag.

8. The apparatus as in claim 7, wherein the seal comprises a foam seal that acts to cushion the RFID tag.

9. The apparatus as in claim 8, wherein the seal covers the RFID tag.

10. The apparatus as in claim 7, wherein the seal is disposed on the perimeters of the first and second cooperating components.

11. The apparatus as claimed in 5, wherein the first and second components comprise a latch at a first end and are configured to be fastened together at a second end, and wherein the latch securely joins the first and second components at the first end when the first and second components are fastened together at the second end.

12. The apparatus as in claim 11, further comprising the latch having a lip on one of the first and second components, the lip being adapted to receive a part of the other component and to retain it when the first and second components are fastened together at the second end.

13. The apparatus as in claim 11, wherein the first and second components are configured to be fastened together at the second end by one or more fasteners from the group of: a rivet, a screw, a bolt, a plastic welding, an adhesive, and a mechanical locking mechanism.

14. The apparatus as in claim 1, wherein the predetermined spacing between the RFID tag holder and the attachment arrangement is selected based on beneficial operation of communication between an antenna of the RFID tag and a receiver.

15. The apparatus as in claim 14, wherein the top of the receptacle comprises a metallic material and acts as a ground plane for the RFID tag antenna.

16. The apparatus as in claim 15, wherein the antenna comprises a monopole antenna and the holder is configured to maintain the antenna in a substantially vertical orientation relative to the receptacle.

17. A housing, comprising:
an RFID tag housing configured to mount to a receptacle;
an RFID tag holder configured to retain an RFID tag; and
an attachment arrangement spaced from the RFID tag holder and configured to attach the housing to the framework and to prevent the RFID tag housing from rotating around the framework, such that, in use, the housing extends upwards from the top of the receptacle, maintaining the RFID tag at a spacing above the top of the receptacle and the framework, thereby ameliorating interference with RFID signals received or emitted by the RFID tag.

18. The housing as in claim 17, wherein the receptacle has a mesh wall framework, and further wherein the attachment arrangement includes a first substantially horizontal opening for accommodating the framework, and a second opening for accommodating an element of the mesh wall framework such that the RFID tag housing is prevented from rotating around the framework.

19. The housing as in claim 17, further comprising first and second cooperating components, together providing the RFID tag holder and attachment arrangement.

20. The housing as in claim 19, wherein the RFID tag holder is a recess formed by one or both of the first and second cooperating components, such that an RFID tag can be placed in the recess when the components are apart and is retained in the recess when the components are together.

21. The housing as in claim 19, wherein the first and second components further comprise a latch at a first end and are configured to be fastened together at a second end, and wherein the latch securely joins the first and second components at the first end when the first and second components are fastened together at the second end.

22. The housing as in claim 21, wherein the latch further comprises a lip on one of the first and second components, the lip adapted to receive a part of the other component and to retain it when the first and second components are fastened together at the second end.

23. The housing as in claim 17, wherein the housing extends upwards from the top of the receptacle to allow for a 360° radiation pattern of RFID signals.

24. A mounting system, comprising:
an RFID tag housing configured to mount to a cage, the cage having mesh walls supported by a framework with one or more top frame members;
the housing further comprising first and second cooperating components configured to engage with each other around at least one of the top frame members, thereby securing the housing to the cage;
the first and second components together providing a first substantially horizontal opening for accommodating the top frame member, and a second opening for accommodating an element of the mesh such that the RFID tag housing is prevented from rotating around the top frame member; and
the first and second components further providing a recess for accommodating an RFID tag, the housing extending upwards from the top frame member such that the recess is spaced above the cage.

25. A housing, comprising:
an RFID tag holder configured to retain an RFID tag with a monopole antenna; and
an attachment arrangement spaced from the RFID tag holder and configured to attach the housing to a metallic element such that the housing extends away from the metallic element to maintain the RFID tag at a spacing from the metallic element, which provides a ground plane for the monopole antenna.

26. The housing as in claim 25, wherein the housing extends upwards from the metallic element to maintain the RFID tag at a spacing above the metallic element.

27. The housing as in claim 26, wherein the monopole antenna is maintained in a substantially vertical orientation.

28. The housing as in claim 25, wherein the metallic element is a frame member of a receptacle.

29. The housing as in claim 25, wherein the attachment arrangement is spaced a predetermined distance from the RFID tag holder.

30. A method of mounting a housing, comprising:
positioning an RFID tag and an insert in a recess of a first component of the housing;
positioning the first component of the housing proximate a frame member of a receptacle;
sliding a top end of a second component of the housing under a lip of the first component of the housing;
rotating the second component of the housing into a position against the first component of the housing; and
coupling the first component of the housing with the second component of the housing using a fastening arrangement.

31. The method of claim 30, wherein the insert in the recess of the first component of the housing protects the RFID tag from contaminants and the coupling of the first component of the housing to the second component of the housing secures the housing to the frame member of the receptacle.

32. The method of claim 30, further comprising:
securing the housing to the frame member of the receptacle in such a manner as to provide a spacing between the receptacle and the RFID tag and prevent rotation of the housing about the frame member of the receptacle.

33. The method of claim 32, wherein the receptacle was a wire mesh framework.

34. The method of claim 30, wherein the fastening arrangement comprises a plurality of cooperating holes.

* * * * *